(No Model.)

H. C. WEEDEN.
FLUSHING APPARATUS FOR CLOSETS AND URINALS.

No. 298,805. Patented May 20, 1884.

WITNESSES
J. Henry Taylor
Loyd B. Wight

INVENTOR.
Henry C. Weeden
by Alex. P. Browne
attorney

N. PETERS, Photo-Lithographer, Washington, D. C.

UNITED STATES PATENT OFFICE.

HENRY C. WEEDEN, OF BOSTON, MASSACHUSETTS.

FLUSHING APPARATUS FOR CLOSETS AND URINALS.

SPECIFICATION forming part of Letters Patent No. 298,805, dated May 20, 1884.

Application filed March 31, 1884. (No model.)

*To all whom it may concern:*

Be it known that I, HENRY C. WEEDEN, of Boston, in the county of Suffolk and State of Massachusetts, and a citizen of the United States, have invented certain new and useful Improvements in Flushing Apparatus for Closets and Urinals, of which the following is a specification.

My present invention relates particularly to improvements in that class of flushing devices which are adapted to produce an automatic intermittent flushing or washing out of water-closets, urinals, and similar structures, and has for its object to provide improved means for accomplishing this result.

Figure 1:
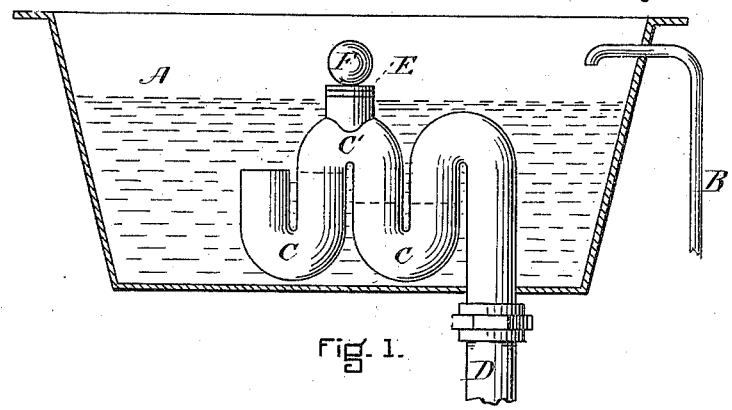
Figure 2:
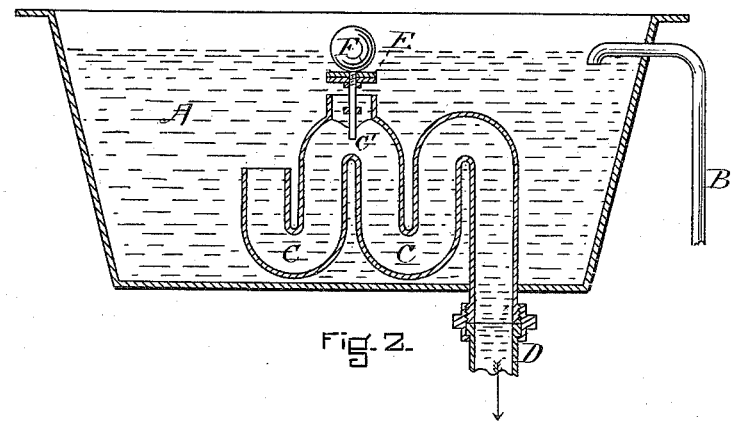
Figure 3:
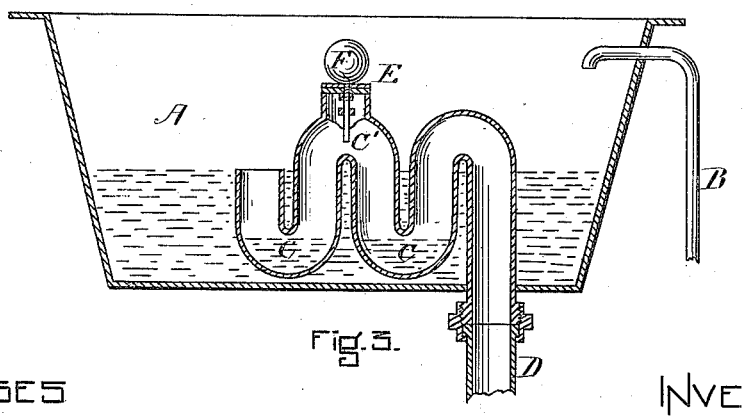

In the drawings, Figures 1, 2, and 3 represent in section and elevation a flushing apparatus embodying my present improvements in the manner now best known to me, which apparatus I will now proceed to describe.

A represents a water-tight box forming a flushing-tank of ordinary construction, the supply of water within which is furnished through the pipe B.

C represents a double S-trap, one end of which communicates with the interior of the tank A, and the other end of which is connected with the outlet to the closet or urinal to be flushed. The middle portion of the double S-trap C, or that part which lies between the two traps, which I have marked C', is provided with a valve or cover, E, which normally closes it air-tight, but which, by reason of its attachment to the float F, will open as the water rises in the tank above the level of the center of gravity of the float.

The object of the device is to provide an automatic regularly intermittent flush, and this is accomplished as follows: Water flowing into the tank A through the supply-pipe B rises to the level of the mouth of the double trap, into which it enters until the two traps stand full of water. The intermediate space, C', is filled with air, which, being held by the water in the adjacent trap, operates as a seal and prevents the escape of water from the tank through the double trap. This condition of the apparatus is shown at Fig. 1. The outlet continues to be sealed in this way until the further rise of the water in the tank A above the center of gravity of the float E raises the cover or valve F and permits the air which had formerly sealed the double trap C to escape. The water which now flows in and fills the place of the escaped air converts the trap C into a siphon. This condition is shown at Fig. 2. The siphon operates to draw off the water from the tank, and by reason of the greater cross-section of the pipe C as compared with the inflow-pipe B the siphon C continues to draw off the water from the tank into the connection D, and thus to the closet or urinal, until the water-level has fallen below the dip of the trap C, or until air has again entered into the trap C and has broken the siphon, as shown at Fig. 3. In the course of the fall of the water, as above described, the cover F has first returned to its place; next, the water in the tank has fallen to the level of the entrance into the trap C, and finally the level of the water in that trap has fallen below the dip of the trap, inasmuch as the siphon action of the trap will continue until the seal of the dip is broken and the air rushes in, whereupon the flush ceases. The continued inflow of water through the pipe B gradually raises the water again in the tank and in the trap C until the air seal is again formed at C', when the further rise of water in the tank causes the same series of operations to be performed and to produce another flush of the same character and in the same manner as before. In this way, by the regular intermittent action of the double trap and its air-escape, as described, an air seal and a siphon being alternately established, an intermittent stoppage and flowing of water is produced at regular intervals, the period of which may be determined by the relative size or capacity of the various parts of the apparatus. In this way an intermittent automatic flush is obtained.

It is obvious that the intermittent character of the operation of my improvement involves the water-inlet B being made of less capacity than the water-outlet C. Should B and C be equal in capacity, the siphon action of C, when once established, and consequently the flush, would be continuous. Should B exceed C in capacity, the same result would follow, and the water would also overflow from the tank A.

I claim—

In combination with a flushing-tank and its supply-pipe, a double-trap outlet-pipe provided at that portion which forms the air-seal with a valve or cover attached to a float, substantially as and for the purposes hereinbefore set forth.

In testimony whereof I have hereunto subscribed my name this 27th day of March, A. D. 1884.

HENRY C. WEEDEN.

Witnesses:
J. HENRY TAYLOR,
JAMES F. BLIGH.